(12) United States Patent
Driehorn et al.

(10) Patent No.: US 8,817,442 B2
(45) Date of Patent: Aug. 26, 2014

(54) SWITCH COMPRISING A TESTABLE CURRENT TRANSFORMER, AND METHOD FOR TESTING A CURRENT TRANSFORMER OF A SWITCH

(75) Inventors: Thomas Driehorn, Berlin (DE); Gerd Müller, Falkensee (DE)

(73) Assignee: Siemens Aktiengesellschaft, Munich (DE)

( * ) Notice: Subject to any disclaimer, the term of this patent is extended or adjusted under 35 U.S.C. 154(b) by 151 days.

(21) Appl. No.: 13/554,824

(22) Filed: Jul. 20, 2012

(65) Prior Publication Data

US 2013/0021710 A1    Jan. 24, 2013

(30) Foreign Application Priority Data

Jul. 20, 2011  (DE) .......................... 10 2011 079 461

(51) Int. Cl.
*H01H 83/00* (2006.01)

(52) U.S. Cl.
USPC .......................................... 361/115; 361/101

(58) Field of Classification Search
USPC ........................ 361/93.1, 101, 115
See application file for complete search history.

(56) References Cited

U.S. PATENT DOCUMENTS

| | | | | |
|---|---|---|---|---|
| 5,179,495 | A | 1/1993 | Zuzuly | 361/94 |
| 5,528,444 | A * | 6/1996 | Cooke et al. | 361/20 |
| 8,081,001 | B2 * | 12/2011 | Hooper et al. | 324/509 |
| 2008/0151462 | A1 * | 6/2008 | Mason et al. | 361/152 |
| 2008/0151463 | A1 * | 6/2008 | Dwyer et al. | 361/186 |

FOREIGN PATENT DOCUMENTS

| | | | |
|---|---|---|---|
| CN | 101983465 A | 3/2011 | |
| DE | 69013683 T2 | 3/1995 | ............. H01H 33/59 |
| DE | 102004011027 A1 | 9/2005 | ............... H01H 1/06 |

OTHER PUBLICATIONS

German Office Action, Application No. 10 2011 079 461.1, 8 pages, Mar. 16, 2012.
European Search Report, Application No. 12174319, 6 pages, Oct. 16, 2012.
Chinese Office Action, Application No. 2012102537093, 8 pages, Apr. 24, 2014.

* cited by examiner

*Primary Examiner* — Rexford Barnie
*Assistant Examiner* — Angela Brooks
(74) *Attorney, Agent, or Firm* — King & Spalding L.L.P.

(57) ABSTRACT

A switch and a method for testing the power transformers of a power supply of the switch are provided, wherein each power transformer generates an analog transformer voltage corresponding to the alternating current, wherein an electronic trip unit, to which each transformer voltage is applied, compares a current derived from each transformer voltage with a current condition, and wherein a rectifier circuit connected to the power transformer charges a capacitor which feeds the power supply of the trip unit. A switching device short-circuits each rectifier circuit when a predefined capacitor voltage is reached. To provide the protective function of the switch, a monostable multivibrator is connected to one pole of each power transformer, wherein each monostable multivibrator is set by the respective transformer voltage and reset after a predefined time, and wherein the level at the output of each monostable multivibrator is used to test the respective power transformer.

10 Claims, 1 Drawing Sheet

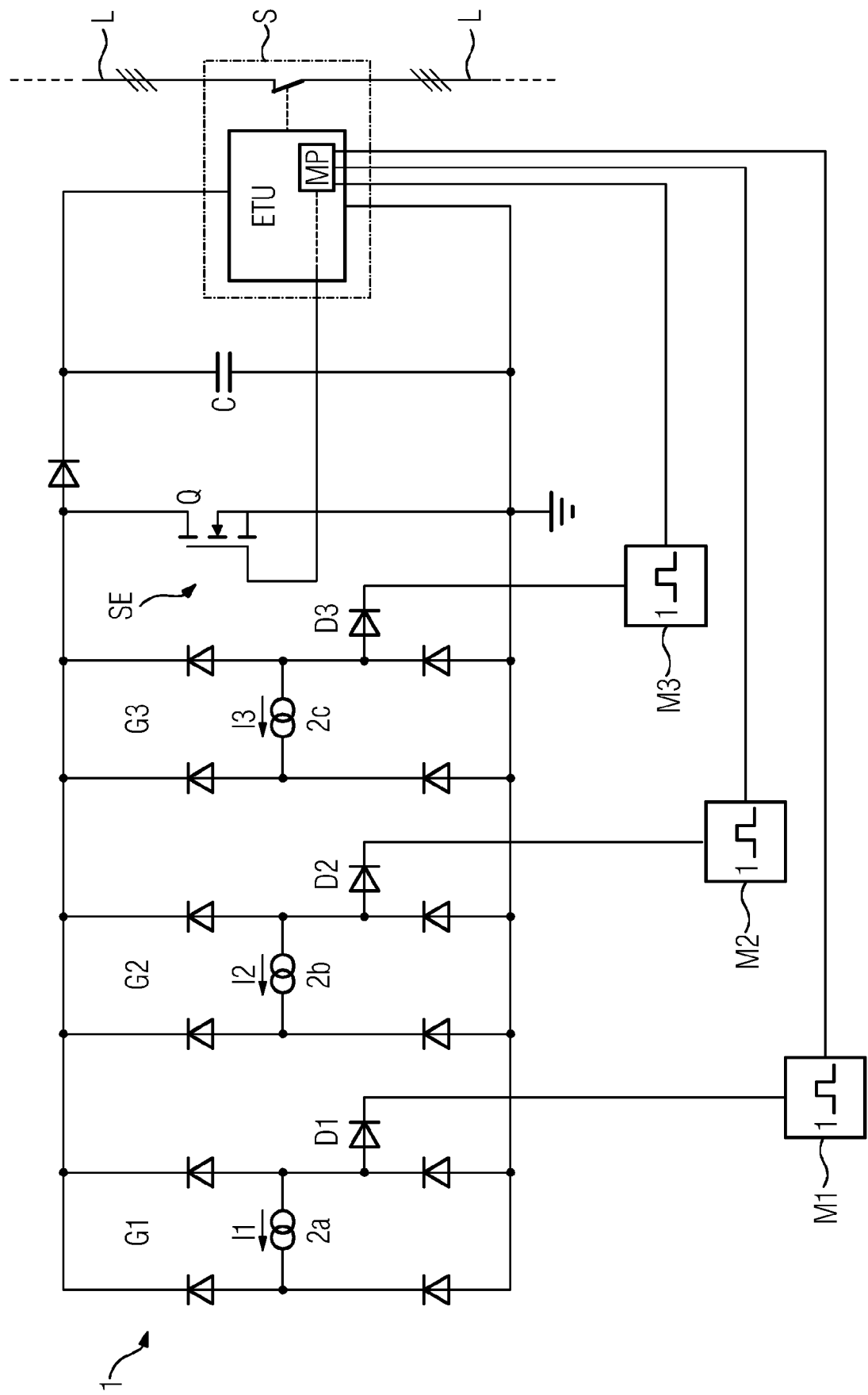

SWITCH COMPRISING A TESTABLE CURRENT TRANSFORMER, AND METHOD FOR TESTING A CURRENT TRANSFORMER OF A SWITCH

CROSS-REFERENCE TO RELATED APPLICATIONS

This application claims priority to DE Patent Application No. 10 2011 079 461.1 filed Jul. 20, 2011. The contents of which is incorporated herein by reference in its entirety.

TECHNICAL FIELD

This disclosure relates to a switch comprising a testable current transformer, e.g., a low-voltage circuit breaker, and a method for testing a current transformer of a switch.

BACKGROUND

Switches, in particular in the form of low-voltage circuit breakers, are known and are used to interrupt an alternating electric current flowing through a conductor. They are used to distribute the current in electrical switchgear and to protect the latter. The switches have switching contacts which are separated from one another by means of a switching mechanism in order to open the switch. Current transformers in the form of an air-cored coil (Rogowski coil) arranged at the conductor act as measurement transformers and generate an analog measurement voltage corresponding to the alternating current, the conductor acting as primary winding. In the case of sustained overloading or in the case of a short circuit, the switch is tripped using the measurement voltage in a manner dependent on parameters and characteristics. For this purpose the measurement voltage is applied to an electronic trip unit which compares the former with a predefined threshold value, the exceedance of which causes the switching contacts to be separated.

In order to supply power (inherent supply) to the trip unit, power transformers (usually iron-cored transformers), which are likewise arranged at the conductor, are used. The reliability of the power supply depends significantly on the power transformer. Circuit interruptions or contact problems in the power transformers can lead to a total failure of the protective function of the switch.

A rectifier circuit is connected to the power transformer, said rectifier circuit charging a capacitor which feeds the power supply, wherein a switching device short-circuits the rectifier circuit in each case when a predefined capacitor voltage (nominal voltage) is reached in order to keep said voltage approximately constant.

In a three-phase power supply system, the current from the power transformers is rectified, for example by means of a three-phase bridge rectifier extended by the neutral conductor input. In this case the circuit is extended by a neutral conductor star point. A capacitor is used here as an energy store. A switching device, for example in the form of a power transistor connected in parallel, short-circuits the power transformer when the capacitor nominal voltage is reached, and thus prevents this from rising further.

In this circuit variant, the current of each individual power transformer cannot be evaluated in a differentiated way for each channel. As a result, it is also not possible to determine which input of the power transformer supplies power and which does not, particularly as compensating currents flow between the power transformers in the three-phase bridge rectifier.

Certain known power supplies have the disadvantage that it is not possible to monitor the power transformers continuously. Any possible damage and, therefore, a malfunction of the switch cannot be detected and signaled, with the result that installation operators cannot immediately exchange the power transformers or the switch.

An overcurrent relay for electrical installations, having a power transformer in the form of a transformer for supplying power to an electronic unit, in particular a trip unit, is already known from DE 690 13 683 T2. In addition to the power transformer, a measurement transformer formed from current-sensing resistors is also present. The power transformer is connected to a rectifier circuit which charges a capacitor to a predefined voltage. Furthermore, the overcurrent relay has a monostable multivibrator to which a signal tapped off from the power transformer is fed via an electronic circuit. An AND gate is connected to the monostable multivibrator and supplies an overload signal in the case of an overload. The overload signal of the AND gate triggers the monostable multivibrator, which causes a transistor switch to turn on in order to trip the overcurrent relay. The monostable multivibrator is used to generate a pulse of sufficient length and thus to ensure in each case that the overcurrent relay is tripped, since the pulse length of the AND gate is not always sufficient for this.

SUMMARY

In one embodiment, a switch is provided for interrupting an alternating electric current flowing through a conductor, the conductor being led through the switch, comprising switching contacts which are separated by means of a switching mechanism in order to open the switch, comprising a measurement transformer which is arranged at the conductor and which generates an analog measurement voltage corresponding to the alternating current, comprising an electronic trip unit to which the measurement voltage is applied and which compares in each case a current derived from the measurement voltage with a current condition and, if the current condition is fulfilled, triggers the separation of the switching contacts by means of the switching mechanism, and comprising a power transformer in the form of an iron-cored transformer arranged at the conductor, which power transformer outputs a transformer voltage and to which power transformer is connected a rectifier circuit which charges a capacitor to a predefined capacitor voltage, this capacitor feeding the power supply of the trip unit, and which is connected to a monostable multivibrator, the output of which is set in each case to a predefined level depending on the operation of the power transformer by signals corresponding to the transformer voltage, wherein a switching device short-circuits the rectifier circuit in each case when the predefined capacitor voltage is reached, in that the monostable multivibrator remains set, as long as the signals from the power transformer are tapped off within a time determined by the time constant of the monostable multivibrator, and in that the level at the output of the monostable multivibrator is used to test the operation of the power transformer.

In another embodiment, a method is provided for testing a power transformer of a power supply of a switch, the power transformer being arranged at a conductor and generating an analog transformer voltage corresponding to the alternating current flowing through the conductor, and the switch: being provided with switching contacts which are separated from one another by means of a switching mechanism in order to open the switch, having a measurement transformer which is arranged at the conductor and which generates an analog measurement voltage corresponding to the alternating current, comprising an electronic trip unit to which the measurement voltage is applied and which compares in each case a current derived from the measurement voltage with a current condition, preferably with a predefined current threshold, and, if the current condition is fulfilled, preferably if the current threshold is exceeded, triggers the separation of the switching contacts by means of the switching mechanism, and having a rectifier circuit connected to the power transformer, which rectifier circuit charges a connected capacitor to a predefined capacitor voltage, this capacitor feeding the power supply of the trip unit, in which signals corresponding to the transformer voltage are passed to a monostable multivibrator which is set by the signals to a predefined level at the output of the monostable multivibrator and in which the level depends on the operation of the power transformer, wherein the rectifier circuit is short-circuited in each case when the predefined capacitor voltage is reached, in that the monostable multivibrator remains set, as long as the signals are tapped off from the power transformer within a time determined by the time constant of the monostable multivibrator, and in that the level is used to test the power transformer.

In a further embodiment, the level is output as a digitally processable signal.

BRIEF DESCRIPTION OF THE DRAWINGS

Example embodiments will be explained in more detail below with reference to figures, in which:

FIG. 1 shows a power supply for a trip unit of a switch, which is a low-voltage circuit breaker, according to an example embodiment.

DETAILED DESCRIPTION

Some embodiments provide a method for testing the power transformers, which are used for supplying power, of a switch, and a switch having testability of the power transformer, in order to ensure the protective function of the switch.

In respect of the switch, some embodiments provide that the input of a monostable multivibrator is connected to one pole of the power transformer, that the monostable multivibrator is set by the transformer voltage, that in each case a predefined time period elapses before the monostable multivibrator is reset, and that the level at the output of the monostable multivibrator is used to test the operation of the power transformer.

In some embodiments, a monostable multivibrator is connected to one pole of the current transformer, is set in each case by the transformer voltage and is reset in each case after a predefined time, and that the level at the output of the monostable multivibrator is used to test the current transformer, wherein a level present (at least temporarily present in each case) indicates the correct operation of the current transformer.

The level may be output as a digitally processable signal.

FIG. 1 shows a power supply 1 for a trip unit ETU of a switch S (shown only schematically), which is a low-voltage circuit breaker, according to an example embodiment. The switch S is used to interrupt three-phase alternating electric currents I1, I2, I3, wherein all three phase conductors L run through the switch S.

The switches S are used to distribute the current in electrical switchgear and to protect the latter. They have switching contacts which are separated from one another by means of a switching mechanism in order to open the switch S. Air-cored coils (Rogowski coils) arranged at the conductors L act as measurement transformers and generate an analog measurement voltage corresponding to the alternating current, the conductor in each case acting as primary winding. In the case of sustained overloading or in the case of a short circuit, the switch S is tripped using the measurement voltage in a manner dependent on parameters and characteristics. The electronic trip unit ETU has a microprocessor MP, and the measurement voltage is applied to the electronic trip unit, which compares said measurement voltage with a predefined threshold value, the exceedance of which causes the switching contacts to be separated.

For the power supply 1 of the trip unit ETU, iron-cored transformers being power transformers 2a, 2b, 2c are arranged at the respectively associated conductor.

In each case a bridge rectifier being a rectifier circuit G1, G2, G3 is connected to the iron-cored transformers for each phase. The bridge rectifiers are connected in parallel and together they charge a buffer capacitor C which feeds the power supply 1, wherein a transistor Q, being a specific switching device SE, short-circuits the rectifier circuit in each case when a predefined capacitor voltage is reached, said capacitor voltage being kept constant in this way.

In general terms, a signal is therefore tapped off, said signal being used to detect a current flow from the power transformer 2a, 2b, 2c (iron-cored transformer). Each primary current flow leads to a secondary current flow in the power transformer 2a, 2b, 2c and therefore to a signal able to be tapped off from the rectifier circuit G1, G2, G3 (bridge rectifier). This signal is used to detect whether or not each power transformer 2a, 2b, 2c is supplying current. The amplitude and the mark-space ratio of this signal are dependent on the size of the primary current and secondary current of the power transformer 2a, 2b, 2c and the clocking of the short-circuiting transistor (determined by means of the power consumption of the overcurrent trip and the present level of charge of the buffer capacitor C).

In each case the input of a retriggerable monostable multivibrator M1, M2, M3 is connected via a diode D1, D2, D3 to one pole of each power transformer 2a, 2b, 2c in order to detect the tapped-off signal which is difficult to evaluate, the transformer voltage (periodically) setting the monostable multivibrator M1, M2, M3 to a predefined high level (output voltage). Thus, certain embodiments provide the feature of passing the tapped-off signal (optionally after further conditioning, amplification and limiting by means of a comparator) to the trigger input of a retriggerable monostable multivibrator. The output of the monostable multivibrator remains active (high level) as long as signals are regularly tapped off from the power transformer 2a, 2b, 2c. If these signals are not present due to a lack of current flowing through the power transformer, for example due to a broken wire or other defect, the output is deactivated after a time determined by the time constant of the monostable multivibrator, that is to say that at the latest after a predetermined time the output is (re)set to its low level. The high level at the output of the monostable multivibrator therefore indicates in each case the correct function of the associated power transformer 2a, 2b, 2c.

The output signals (low level, high level) of the retriggerable monostable multivibrator M1, M2, M3 are digitally detected and, together with the measurement voltages (from the Rogowski coils), are processed further. The power-transformer currents are evaluated by means of the monostable multivibrator M1, M2, M3 independently of the amplitude and the waveform which occurs. Even non-sinusoidal power-transformer currents which are pulsed enable reliable testing as the monostable multivibrator can be retriggered even with short pulses.

Both levels of the monostable multivibrator are therefore able to be processed digitally and will be connected for further processing expediently without an intermediate stage directly to the microprocessor MP of the trip unit ETU.

As an alternative, it is also possible simply for an indicator to be connected to the output of the monostable multivibrator, which indicator, in the simplest embodiment thereof, has a light emitting diode as a luminous element which indicates in each case the high level at the output of the monostable multivibrator.

What is claimed is:

1. A switch for interrupting an alternating current flowing through a conductor that is led through the switch, the switch comprising:
    a switching mechanism configured to separate switching contacts in order to open the switch,
    a measurement transformer arranged at the conductor and configured to generate an analog measurement voltage corresponding to the alternating current,
    an electronic trip unit to which the measurement voltage is applied, the electronic trip unit configured to:
        compare a current derived from the measurement voltage with a predefined current threshold and,
        if the current exceeds the current threshold, controlling the switching mechanism to trigger a separation of the switching contacts,
    an iron-cored power transformer arranged at the conductor, the power transformer configured to output a transformer voltage,
    a rectifier circuit connected to the power transformer and configured to charge a capacitor to a predefined capacitor voltage, the capacitor configured to feed the power supply of the trip unit, the capacitor being connected to a monostable multivibrator, the output of which is set to a predefined level depending on the operation of the power transformer by signals corresponding to the transformer voltage,
    a switching device configured short-circuit the rectifier circuit when the predefined capacitor voltage is reached,
    wherein the monostable multivibrator remains set, as long as the signals from the power transformer are tapped off within a time determined by the time constant of the monostable multivibrator, and
    wherein the level at the output of the monostable multivibrator is used to test the operation of the power transformer.

2. A method for testing a power transformer of a power supply of a switch, comprising:
    a power transformer arranged at a conductor generating an analog transformer voltage corresponding to an alternating current flowing through the conductor,
    providing a switching mechanism configured to control the switch configured to separate switching contacts from each other in order to open the switch,
    a measurement transformer arranged at the conductor generating an analog measurement voltage corresponding to the alternating current,
    an electronic trip unit comparing a current derived from the measurement voltage with a predefined current threshold,
    in response to a determination the current threshold is exceeded, the electronic trip unit controlling the switching mechanism to separate the switching contacts and
    a rectifier circuit connected to the power transformer charging a connected capacitor to a predefined capacitor voltage, the capacitor feeding the power supply of the trip unit,
    passing signals corresponding to the transformer voltage to a monostable multivibrator that is set by the signals to a predefined level at the output of the monostable multivibrator, wherein the level depends on the operation of the power transformer,
    short-circuiting the rectifier circuit in response to the predefined capacitor voltage being reached,
    maintaining the monostable multivibrator at the predefined level as long as the signals are tapped off from the power transformer within a time determined by the time constant of the monostable multivibrator, and
    using the predefined level to test the power transformer.

3. The method of claim 2, comprising outputting the level as a digitally processable signal.

4. The method of claim 2, wherein multiple power transformers are connected to the conductor, each power transformer generating an analog transformer voltage corresponding to an alternating current flowing through the conductor.

5. The method of claim 4, wherein multiple rectifier circuits are provided, each rectifier circuit connected to one of the multiple power transformers and charging a connected capacitor to a predefined capacitor voltage.

6. The method of claim 4, wherein multiple monostable multivibrators are provided,
    the method comprising setting each monostable multivibrator by signals corresponding to one of the transformer voltages to a predefined level at an output of the monostable multivibrator.

7. The switch of claim 1, wherein the level is output as a digitally processable signal.

8. The switch of claim 1, wherein multiple power transformers are connected to the conductor, each power transformer configured to generate an analog transformer voltage corresponding to an alternating current flowing through the conductor.

9. The switch of claim 8, wherein multiple rectifier circuits are provided, each rectifier circuit connected to one of the multiple power transformers and configured to charge a connected capacitor to a predefined capacitor voltage.

10. The switch of claim 8, wherein multiple monostable multivibrators are provided, each monostable multivibrator being set by signals corresponding to one of the transformer voltages to a predefined level at an output of the monostable multivibrator.

* * * * *